United States Patent [19]
Doble

[11] 3,900,202
[45] Aug. 19, 1975

[54] CONVERTIBLE UTILITY CART

[76] Inventor: James W. Doble, 418 Dovedale Dr., Whitby, Ontario, Canada

[22] Filed: Mar. 21, 1974

[21] Appl. No.: 453,269

[52] U.S. Cl. ............................. 280/8; 280/43.24
[51] Int. Cl.² ..................................... B62B 13/18
[58] Field of Search ........ 280/8, 9, 11, 43.17, 43.24

[56] References Cited
UNITED STATES PATENTS

| | | | |
|---|---|---|---|
| 1,526,270 | 2/1925 | Egan | 280/11 |
| 2,461,609 | 2/1949 | Light | 280/11 |
| 2,926,021 | 2/1960 | Altadonna | 280/11 |
| 3,503,620 | 3/1970 | Koskovich | 280/11 |

*Primary Examiner*—Robert R. Song
*Attorney, Agent, or Firm*—Howard I. Podell

[57] ABSTRACT

A utility type cart designed for towing by hand or behind a bicycle which can be quickly converted without the use of tools from a wheeled vehicle into a sled-type unit for use on snow. A pair of wheels are mounted on a pivotably attached tow bar member joined to the tow bar handle, such that rotation of the handle about the top of the cart, from one end of the cart to the other end, acts to elevate or depress the wheels above or below the level of the cart bottom.

2 Claims, 7 Drawing Figures

PATENTED AUG 19 1975　　3,900,202

3,900,202

CONVERTIBLE UTILITY CART

SUMMARY OF THE INVENTION

This invention relates to a utility cart and particularly to one in which the tow bar and frame are integrally fitted with wheels and pivotably mounted to the cart sides so that the cart is quickly convertible from a wheeled vehicle to one with a toboggan-like base for use over snow-covered ground. The cart is fitted with a cover which can be raised and held in placed by expandable side panels so as to accommodate large or bulky loads.

An advantage of this invention is that it may be used both in summer and winter regardless of the weather.

A further advantage is that during the winter the cart is instantly convertible from a wheeled vehicle to a sled-type vehicle in the loaded or unloaded condition.

The invention consists of a box-like structure built of a light strong material, such as fiber glass reinforced plastic, with a bottom having external molded or attached runner like protrusions and having at lease one end of the bottom curved upwards, similar to the front of a toboggan. This box-like structure is pivotably joined on both sides of the structure to a tubular metal yoke-like frame, on end of which is shaped as a towing handle, with the other end fastened to rotatable wheels. The frame is pivotably mounted to the sides of the structure so as to, in one position, rest the cart on the wheels, while in a second position, the wheels are raised above the level of the bottom of the cart allowing the cart to ride on the runners of the cart bottom. The like frame is held in either of the two positions by an adjustable securing attachment which clips to brackets that are mounted on both ends of the box structure. The cart is also fitted with a two-piece cover and with extendable sides which may be raised and locked into position to accommodate large bulky loads. A third wheel, of the free rotating caster type, is fitted to the front mounting of the cart so that hand towing of the cart is both easy and safe. The third wheel is retractable about its mounting when the cart is towed by a bicycle, or when the cart is rested on its runners.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
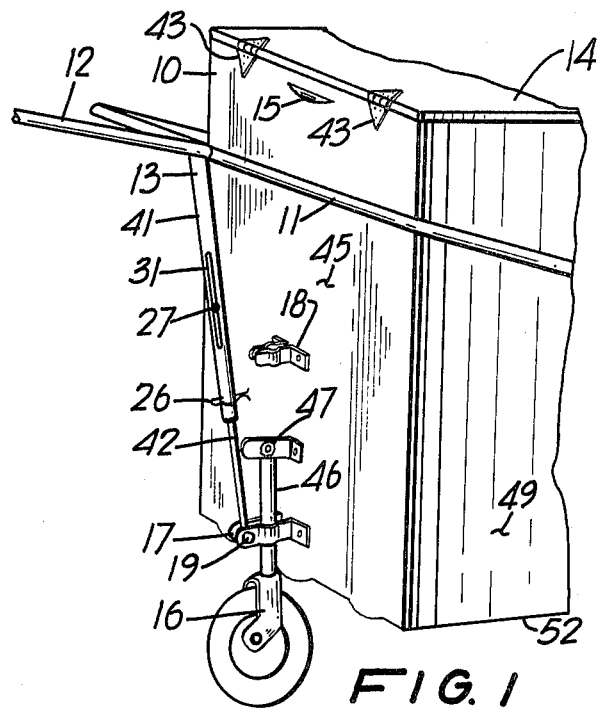
FIG. 1 is a fragmentary perspective view of the front of the cart, arranged for hand towing.

Turning now descriptively to the drawings, in which similar reference characters denote similar elements throughout the several views, FIG. 1 illustrates the device 10 ready for use as a hand-towed cart. The frame 11 and attached integral tow bar 12 are mounted to a telescopic securing attachment 13 in the form of a tubular member which may be pinned to the holding bracket 17 of the front caster wheel 16 as shown in FIG. 1. The securing attachment 13 is connected to the holding bracket 17 by means of a spring loaded pin 19 and is telescopically adjusted in length by means of the pin 26 which locks the telescoping sections 41 and 42 forming attachment 13 to the proper towing height.

The top door 14 of the cart is shown in its closed position, fastened by hinges 43 to the front side 45. A supplementary carrying handle 15 is also attached to front side 45.

The bottom 52 of the structure 10 is fitted with three longitudinal snow runners 20.

Figure 2:
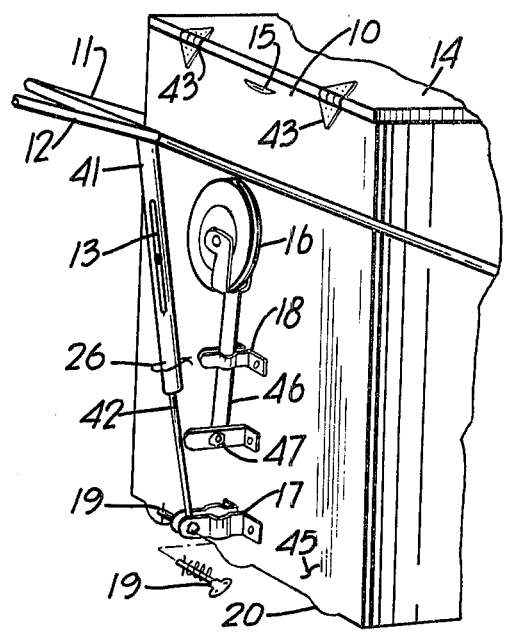
FIG. 2 is a fragmentary perspective view of the front of the device fitted for towing by means of a bicycle.
Figure 3:
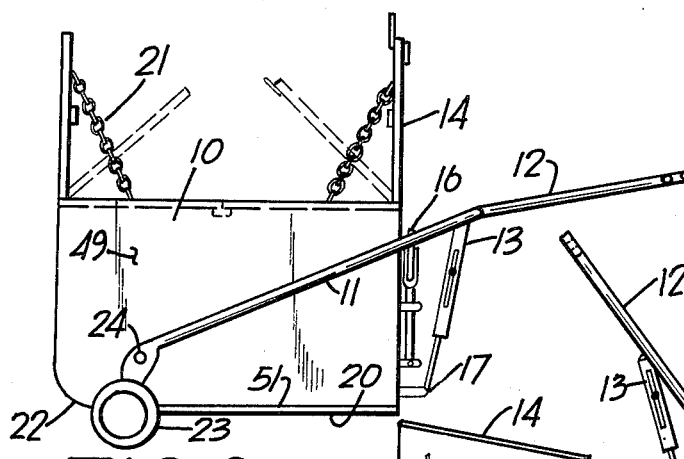
FIG. 3 is a side elevation view of the device as set for wheeled towing.

In FIGS. 2 and 3, the device is shown in a wheeled towing position for use behind a bicycle or other vehicle. In this condition the vertical support 46 of the caster wheel 16 has been released from the lower bracket 17, rotated about pivot pin 47 and fastened in an upright out-of-the-way position by the supplementary bracket 18 attached to the front side 45. The securing attachment 13 of the tow bar frame 11 is then adjusted by means of the sliding telescopic sections 41 and 42 to a height suitable for bicycle towing of tow bar 12.

The ends of the integral frame 11 are connected on each side 48 of the cart to a rotatable wheel 23. A pivot pin 24, fastened to each cart side 49 is rotatably fastened to the yoke frame 11.

In FIG. 3, the top doors 14 are shown in the open extended position, each held by a securing chain 21 fastened to the inside bottom 51.

Figure 4:
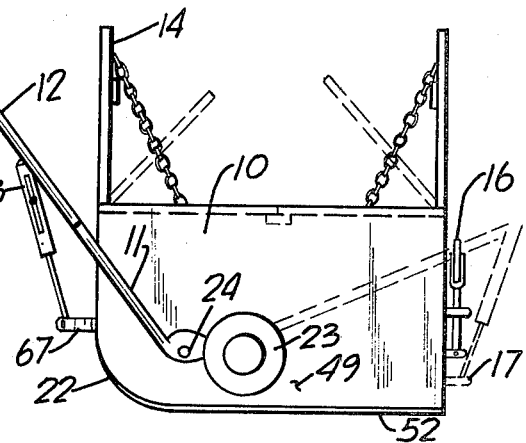
FIG. 4 is a side elevation view of the device arranged for towing as a sled.
Figure 5:
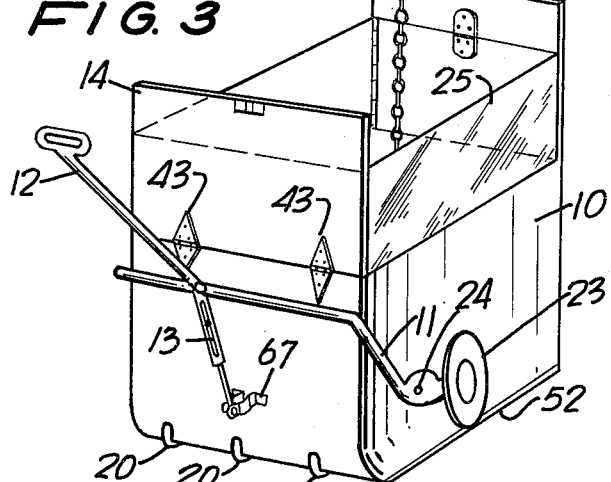
FIG. 5 is a perspective view of the device in use as a sled with the top doors and the side extensions locked into the elevated position.

FIGS. 4–5 show the device 10 arranged for travelling over snow, with the frame 11 and tow bar handle 12 rotated from the forward wheeled towing position to the rear end of the cart which becomes the forward end of the cart in the toboggan mode, with the bottom end 22 of the cart curved to ride over snow. In this toboggan position, the wheels 23 are raised off the ground and above the level of the bottom 52 of the cart. The securing attachment 13 is secured to the bracket 67 at the toboggan end of the cart 10.

The top doors 14 are shown raised about hinges 43 to a fully open position, in FIG. 5, locked to extendable sides 25 mounted on the sides 49 of the cart. Added height is thus provided to the cart 10 for carrying large bulky loads.

Figures 6A, 6B:
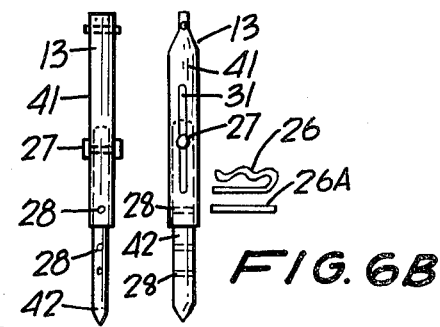
FIG. 6A is a detailed elevation view of the securing attachment of the towing yoke.
FIG. 6B is a side view of the securing attachment.

FIG. 6 shows a detail of the adjustable securing attachment 13 which consists of two relatively short lengths of telescopic tubing 41 and 42 which are held together by pin 27 which slides in the slot 31 of tube 41. The length of this attachment 13 is adjusted and held in place by the pin 26 or pin 26A which is inserted through the holes 28 in both members 29 and 30.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A utility cart designed to be alternately towed either on wheels or on snow runners with the wheels raised above the bottom of the cart body, comprising a cart body formed with a bottom panel joined to two side panels and two end panels fitted with sled-like runners attached to the undersurface of the bottom panel of the cart body, with an assembly of two wheels each rotatably fitted to an end of a U-shape frame that is pivotably mounted to each of the two side panels of the cart body, said frame being of a size to extend about the side panels and alternately extend about either the first end panel or the second end panel of the cart body, depending upon the pivoted position of the frame, with the wheels that are attached to the frame ends oriented so that the bottom of the wheels lie below the plane of the undersurface of the sled-like runners when the frame is pivoted to extend about the said first end panel, and with said wheels oriented so that the bottom of the wheels lie above the plane of the bottom panel of the cart body when the frame is pivoted to extend about the said second end panel, said frame integrally fastened to a tow bar that extends from the general mid-section of the frame in a direction away from the cart body, together with a telescopic member fastened to one end to the assembly of the tow bar and frame, which telescopic member may be latched at its other end alternately to a bracket fastened to the first end panel or to a similar bracket fastened to the second end panel, for securing the two bar and frame assembly in either one or two positions for either towing the cart with the first end panel in the forward position with the wheels engaging the ground surface below the cart bottom or alternately towing the cart with the second end panel in the forward position and with the wheels upraised so that the sled-like runners contact the ground surface below the cart bottom.

2. A utility cart as described in claim 1 with a caster wheel fitted on one cart panel end, said wheel mounted on a retractable member which may be rotated into a first position in which the wheel rests below the level of the bottom of the cart or into a storage position in which the wheel is located above the level of the bottom of the cart.

* * * * *